United States Patent [19]

Leblans et al.

[11] Patent Number: 5,422,220
[45] Date of Patent: Jun. 6, 1995

[54] PHOTOSTIMULABLE PHOSPHORS

[75] Inventors: Paul Leblans, Berchem; Albert D. Adriaensens, Mortsel, both of Belgium; Melvin Tecotzky, Mendham, N.J.; Jan A. Van den Bogaert, Schilde, Belgium

[73] Assignee: Agfa-Gevaert, N.V., Mortsel, Belgium

[21] Appl. No.: 243,516

[22] Filed: May 16, 1994

Related U.S. Application Data

[63] Continuation of Ser. No. 941,167, Sep. 4, 1992, abandoned.

[30] Foreign Application Priority Data

Sep. 17, 1991 [EP] European Pat. Off. ............ 91202379

[51] Int. Cl.$^6$ .................................................. G03C 5/16
[52] U.S. Cl. ..................................... 430/139; 430/945; 252/301.4 R; 252/301.4 H; 250/483.1; 250/486.1; 428/691
[58] Field of Search .................. 430/139, 945; 252/301.4 R, 301.4 H; 250/483.1, 484.1; 428/691

[56] References Cited

U.S. PATENT DOCUMENTS

| | | | |
|---|---|---|---|
| 4,239,968 | 12/1980 | Kotera et al. | 250/484.1 |
| 4,508,636 | 4/1985 | Ochiai | 250/483.1 |
| 4,535,237 | 8/1985 | Takahashi et al. | 252/301.4 H |
| 4,740,699 | 4/1988 | Miura et al. | 250/484.1 |
| 5,098,813 | 3/1992 | Nakano et al. | 430/139 |
| 5,151,604 | 9/1992 | Kohda et al. | 430/139 |

FOREIGN PATENT DOCUMENTS 0345904 12/1989 European Pat. Off. .
0155487 9/1984 Japan .

*Primary Examiner*—Thomas R. Neville
*Attorney, Agent, or Firm*—Breiner & Breiner

[57] ABSTRACT

A photostimulable phosphor of which the emission intensity at the stimulation wavelength of 550 nm is higher than the emission intensity at the stimulation wavelength of 600 nm, characterized in that said phosphor is a divalent europium activated barium fluorobromide containing as codopant samarium, and wherein the terminology barium fluorobromide stands for an empirical formula wherein (1) a minor part of the barium (less than 50 atom %) is replaced optionally by at least one metal selected from the group consisting of a monovalent alkali metal, a divalent alkaline earth metal other than barium, and a trivalent metal selected from the group consisting of Al, Ga, In, Tl, Sb, Bi, Y, and a rare earth metal selected from the group consisting of Ce, Pr, Nd, Gd, Tb, Dy, Ho, Er, Tm, Yb and Lu, (2) a minor part (less than 50 atom %) of the bromine is replaced by chlorine, and/or iodine, and (3) wherein fluorine is present stoichiometrically in a larger atom % than bromine taken alone or bromine combined with chlorine and/or iodine.

10 Claims, 4 Drawing Sheets

PHOTOSTIMULABLE PHOSPHORS

This is a continuation of application Ser. No. 07/941,167 filed on Sep. 4, 1992, now abandoned.

FIELD OF THE INVENTION

The present invention relates to a storage phosphor which emits fluorescent light on photostimulation after being exposed to penetrating radiation.

BACKGROUND OF THE INVENTION

In radiography the interior of objects is reproduced by means of penetrating radiation, which is high energy radiation also known as ionizing radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube. A survey of lasers useful in the read-out of photostimulable latent fluorescent images is given in the periodical Research Disclosure December 1989.

Of special interest in the application of said image recording and reproducing method are particular barium fluorohalide phosphors identified in U.S. Pat. No. 4,239,968. The light output of these phosphors upon stimulation with helium-neon laser beam (633 nm) is compared with the stimulated light output of SrS:0.0001Eu.0.0001Sm photostimulable phosphor described in U.S. Pat. No. 3,859,527, the basic patent in the field of radiography operating with photostimulation of storage phosphors.

According to U.S. Pat. No. 4,239,968 a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, characterized in that said phosphor is at least one phosphor selected from the group of alkaline earth metal fluorohalide phosphors represented by the formula:

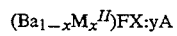

$(Ba_{1-x}M_x^{II})FX:yA$ wherein:

$M^{II}$ is one or more of Mg, Ca, Sr, Zn and Cd;
X is one or more of Br, Cl or I;
A is at least one member of the group consisting of Eu, Tb, Ce, Tm, Dy, Pr, Ho, Nd, Yb and Er; and
x is in the range $0 < X < 0.6$ and y is in the range $0 < y < 0.2$, and that the wavelength of said stimulating rays is not less than 500 nm.

In FIG. 3 of said U.S. Patent a graph shows the relationship between the wavelength of the stimulation rays and the luminance of the stimulated light, i.e. the stimulation spectrum wherefrom can be learned that said kind of phosphor has high photostimulation sensitivity to stimulation light of a He-Ne laser beam (633 nm) but poor photostimulability below 500 nm. The stimulated light (fluorescent light) is situated in the wavelength range of 350 to 450 nm with a peak at about 390 nm (ref. the periodical Radiology, Sept. 1983, p.834.).

It can be learned from said U.S. Pat. No. 4,239,968 that it is desirable to use a visible ray-stimulable phosphor rather than an infra-red ray-stimulable phosphor because the traps of an infra-red-stimulable phosphor are shallower than these of the visible ray-stimulable phosphor and accordingly the radiation image storage panel comprising the infra-red ray-stimulable phosphor exhibits a relatively rapid dark-decay (fading). Taking into account image fading read-out has to proceed relatively soon after the image-wise exposure to penetrating radiation and the read-out time (scanning time) has to be kept fairly short. Indeed, as explained in said U.S. Patent when the panel comprising an infra-red ray-stimulable phosphor is scanned with infra-red rays, and the fluorescent light emitted therefrom is processed electrically, a certain period of time is required to scan the overall face of the panel, and accordingly, there is the possibility that a difference arises between the initial output and the final output even though the initial portion and the final portion of the panel absorb the same amount of radiation beforehand.

For solving the problem described above it is desirable to use a photostimulable storage phosphor which has traps as deep as possible to avoid fading and to use for emptying said traps light rays having substantially higher photon energy (shorter wavelength) than the usual He-Ne laser beam of 633 nm.

Taking into account the objective of reducing the image-fading and the fact that the fluorescent light emission of barium fluoride-halide phosphors is situated at about 390 nm and is practically nihil at 450 nm preference is given to such phosphors having a stimulation maximum at about 500 nm which is still sufficiently remote from the emission spectrum of their fluorescent (stimulated) light in order to allow a good separation by optical filter means of the stimulated light from the stimulating light. The filter means absorbs or rejects the stimulating light and prevents it from entering the detector means, e.g. a photomultiplier tube having a photo-electron emission sensitivity matching the wavelength range of the stimulated light.

A further advantage of photostimulation with shorter wavelength light in comparison with the commonly used 633 nm He-Ne laser beam is an improvement in image-sharpness because shorter wavelength light of e.g. 500 nm and shorter is less diffracted in a phosphor panel containing in a binder the dispersed phosphor acting as a diffraction grating.

Bearing in mind the above, attempts have been made to formulate phosphor compositions showing a stimulation spectrum in which the emission intensity at the stimulation wavelength of 500 nm is higher than the emission intensity at the stimulation wavelength of 600 nm. A suitable phosphor for said purpose is described in U.S. Pat. No. 4,535,237 in the form of a divalent europium activated barium fluorobromide phosphor having the bromine-containing portion stoichiometrically in excess of the fluorine.

A divalent europium activated barium fluorobromide phosphor prepared for said purpose is obtained by using predetermined amounts of barium fluoride and a compound of trivalent europium, and barium halide (except for barium fluoride) in an amount more than the stoichiometric amount. The firing as explained in the Example i proceeds in a reducing atmosphere to convert $Eu^{3+}$ into $Eu^{2+}$.

According to claim 1 of said U.S. Pat. No. 4,535,237 the photostimulation of the phosphor with its higher emission intensity by stimulation at 500 nm proceeds with light in the wavelength range of 550 to 800 nm.

In U.S. Pat. No. 4,948,696 a divalent europium activated complex halide phosphor is described represented by the formula:

$$BaFX \cdot xNaX' : aEu^{2+}$$

wherein X and X' each designate at least one of el, Br and I, x is a number satisfying $0 < X < 10^{-1}$, and a is a number satisfying $0 < a < 0.2$.

Said phosphor, actually by the definition of X, X' and "x" being likewise a phosphor having the halides other than fluorine stoichiometrically in excess of the fluorine, is claimed for use in radiography wherein the phosphor after its X-ray exposure is photostimulated with light in the wavelength range of 450 to 1,100 nm. According to the stimulation spectrum given of a particular phosphor in FIG. 1 in said lastmentioned U.S. Patent the stimulation peak is above 600 nm and photostimulability drops considerably below 500 nm.

In European patent specification 0 021 342 (see also U.S. Pat. No. 4,512,911) a rare earth element activated complex halide phosphor is described of which the luminance of light emitted upon photostimulation is enhanced by incorporating in the phosphor at least one fluoride selected from the group consisting of specific alkali metal fluorides, specific divalent metal fluorides and specific trivalent metal fluorides in a proper amount as the constituent of the host material of the phosphor which is represented by the formula:

$$Ba\ F_{2-a}\ BaX_2 \cdot bMgF_2 \cdot cMe^{I}F \cdot dMe^{II}F_2 \cdot eMe^{III}F_3 : fLn$$

wherein X is at least one halogen selected from the group consisting of chlorine, bromine and iodine, $Me^{I}$ is at least one alkali metal selected from the group consisting of lithium and sodium, $Me^{II}$ is at least one divatent metal selected from the group consisting of beryllium, calcium and strontium, $Me^{III}$ is at least one trivatent metal selected from the group consisting of aluminium, gallium, yttrium and lanthanum, Ln is at least one rare earth element selected from the group consisting of europium, cerium and terbium, and a, b, c, d, e and f are numbers satisfying the conditions of $0.90 < a < 1.05$, $0 < b < 1.2$, $0 < c < 0.9$, $0 < d < 1.2$, $0 < e < 0.03$, $100^{-6} < f < 0.03$ and $c+d+e$ not equal to zero.

The phosphors according to said lastmentioned formula are claimed to emit light of higher luminance than the conventional rare earth element activated divalent metal fluorohalide phosphor when stimulated by light of wavelength ranging from 450 to 800 nm after exposure to ionizing radiation such as X-rays. A stimulation spectrum of said phosphors has not been given, the measurement of luminance by photostimulation was performed with light of 630 nm which was obtained by causing the light emitted by a xenon lamp in a spectroscope to pass through a diffraction grating.

In published European patent applications (EP-A) 0 345 903, 0 345 904 and 0 345 905 (see also U.S. patent application Ser. Nos. 07/426,841, 07/426,895, 07/426,896 and 07/426,897) barium fluorohalide phosphors are mentioned that are not within the scope of the above mentioned empirical formula of said EP-A 0 021 342 and wherein the high yield of fluorescent light on photostimulation is the result of the presence of strontium and of fluorine stoichiometrically in larger atom % than bromine taken alone or bromine combined with chlorine and/or iodine. The presence of Sr together with a stoichiometric excess of fluoride with respect to the other halides at concentrations outside the preferred concentration ranges stipulated in claim 21 of said EP-A 0 021 342 surprisingly brings about a substantial increase in the X-ray conversion efficiency on photostimulation with He-Ne (633 nm) laser beam as illustrated e.g. in FIG. 6 of published EP-A 0 345 903 and FIG. 3 of published EP-A 0 345 904.

In published EP-A 0 345 905 a rare earth metal doped barium strontium fluoride phosphor is claimed characterized by the following empirical formula:

$$Ba_{1-x}Sr_xF_{2-a-b}Br_aX_b : zA$$

wherein:

X is at least one member selected from the group Consisting of Cl and I;

x is in the range $0 < X < 0.15$;

a is in the range $0.70 < a < 0.96$;

b is in the range $0 < b < 0.15$;

z is in the range $10^{-7} < z < 0.15$, and

A is $Eu^{2+}$ or $Eu^{2+}$ together with one or more co-dopants selected from the group consisting of $Eu^{3+}$, Tm, Dy, Pr, Ho, Nd, Yb, Er, Gd and Lu, and wherein fluorine is present stoichiometrically in said phosphor in a larger atom % than bromine taken alone or bromine combined with chlorine and/or iodine. From FIG. 3 of said lastmentioned published EP-A can be learned that that the gadolinium co-doped phosphor prepared according to INVENTION EXAMPLE 1 described therein is characterized by a stimulation spectrum having a maximum below 500 nm. The gadolinium co-dopant has been introduced in the phosphor firing mixture as $GdF_3$ in the presence of $EuF_3$, $BaF_2$ and $SrF_2$. An amount of $NH_4Br$ has been used in a substoichiometric quantity (94.2% of the stoichiometric amount) to obtain a phosphor with fluorine stoichiometrically in excess with respect to bromine.

During the firing of the barium fluoride with ammonium bromide some of the ammonium bromide sublimates (542° C.) so that not all the bromine of the raw material mixture is built-in in the phosphor structure.

OBJECTS AND SUMMARY OF THE INVENTION

It is an object of the present invention to provide new phosphors having a particularly slow dark-decay of energy stored on irradiation with penetrating radiation and wherein the energy stored in said phosphor can be freed efficiently as fluorescent light by photostimulation with light in a wavelength range below 550 nm, so that light of an argon ion laser corresponding with its main emission lines of 514.5 nm and 488 nm and frequency doubled light (532 nm) of a solid state Nd-YAG laser originally emitting at 1064 nm can be more efficiently used in photostimulation than He-Ne laser light of 633 nm.

It is another object of the present invention to provide an X-ray screen or panel containing said photostimulable phosphor dispersed in a binder layer.

It is a further object of the present invention to provide a method of recording and reproducing a pattern of penetrating radiation by means of a panel including said phosphor in dispersed form thereby yielding on photostimulation with light in the wavelength range below 550 nm images of higher sharpness than can be obtained by photostimulation with light in a wavelength range above 600 nm.

Other objects and advantages of the present invention will become clear from the following description.

In accordance with the present invention a photostimulable phosphor is provided of which the emission intensity at the stimulation wavelength of 550 nm is higher than the emission intensity at the stimulation wavelength of 600 nm, characterized in that said phosphor is a divalent europium activated barium fluorobromide, and wherein the terminology barium fluorobromide is within the scope of an empirical formula wherein (1) a minor part of the barium (less than 50 atom %) is replaced optionally by at least one metal selected from the group consisting of an alkali metal, alkaline earth metal other than barium, trivalent metal selected from the group consisting of Al, Ga, In, Tl, Sb, Bi, Y, the rare earth metals Ce, Pr, Nd, Gd, Tb, Dy, Ho, Er, Tm, Yb and Lu, and (2) a minor part (less than 50 atom %) of the bromine is replaced by chlorine, and/or iodine.

In accordance with the present invention a radiation image recording and reproducing method is provided which method comprises the steps of:

(i) causing said europium-activated samarium-codoped barium fluorobromide phosphor to absorb penetrating radiation having passed through an object or emitted by an object and to store energy of said penetrating radiation in said phosphor, (ii) stimulating said phosphor with visible radiation in the wavelength range from 440 nm to 550 nm, preferably in the wavelength range of 480 to 540 nm, to release energy stored in said phosphor as fluorescent light differing in wavelength range from the stimulating light, and (iii) detecting said fluorescent light.

DETAILED DESCRIPTION OF THE INVENTION

Preferred photostimulable phosphors according to the present invention contain samarium with respect to barium in an atom percent in the range of $10^{-5}$ to $10^{-1}$ at %.

Preferred photostimulable phosphors according to the present invention contain an alkali metal selected from the group consisting of Li, Na, K, Rb and Cs, with respect to barium in an atom percent in the range of $10^{-4}$ to $10^{-2}$ at %.

Preferred photostimulable phosphors according to the present invention contain an alkaline earth metal selected from the group consisting of Sr, Mg and Ca with respect to barium in an atom percent in the range of $10^{-3}$ to $2 \times 10^{-1}$ at %. From said alkaline earth metals Sr is most preferred for increasing the X-ray conversion efficiency of the phosphor.

Preferred photostimulable phosphors according to the present invention contain a rare earth metal selected from the group consisting of Ce, Pr, Nd, Gd, Tb, Dy, Ho, Er, Tm, Yb and Lu with respect to barium in an atom percent in the range of $10^{-3}$ to $10^{-1}$ at %. From said rare earth metals Gd is preferred for obtaining a shift of the maximum of the photostimulation spectrum of the phosphor to the shorter wavelengths.

Preferred photostimulable phosphors according to the present invention contain a trivalent metal selected from the group consisting of Al, Ga, In, Tl, Sb, Bi and Y with respect to barium in an atom percent in the range of $10^{-3}$ to $10^{-1}$ at %. From said trivalent metals Bi is preferred for obtaining a shift of the maximum of the photostimulation spectrum of the phosphor to the shorter wavelengths.

In the phosphors according to the present invention the bromine-containing portion may be (1) stoichiometrically equivalent with the fluorine portion as e.g. in the phosphor described in claim 1 of U.S. Pat. No. 4,239,968, (2) may be substoichiometrically present with respect to the fluorine portion as described e.g. in published EP-A 0 021 342 or 0 345 904 and U.S. Pat. No. 4,587,036, or (3) may be superstoichiometrically present with respect to the fluorine portion as described e.g. in claim 1 of U.S. Pat. No. 4,535,237.

Preferred phosphors for use according to the present invention are phosphors wherein fluorine is present stoichiometrically in a larger atom % than bromine taken alone or bromine combined with chlorine and/or iodine, e.g. fluorine is present in 3 to 12 atom % in excess over bromine or bromine combined with chlorine and/or iodine.

Particularly interesting phosphors according to the present invention are within the scope of the following empirical formula (I):

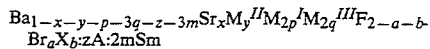

wherein:
X is at least one halogen selected from the group consisting of Cl and I,
$M^I$ is at least one alkali metal selected from the group consisting of Li, Na, K, Rb and Cs;

$M^{II}$ is at least one alkaline earth metal selected from the group consisting of Ca and Mg;

$M^{III}$ is at least one metal selected from the group consisting of Al, Ga, In, Tl, Sb, Bi, Y or a trivalent lanthanide, e.g. La, Ce, Pro Nd, Gd, Tb, Dy, Ho, Er, Tm, Yb, and Lu;

a is a number satisfying the conditions of $0.85 < a < 0.96$ when x is $0.17 < x < 0.55$ and $0.90 < a < 0.96$ when x is $0.12 < x < 0.17$;

y is in the range $0 < y < 10^{-1}$;

b is in the range $0 < b < 0.15$;

p is in the range $0 < p < 0.3$;

q is in the range $0 < q < 0.1$;

z is in the range $10^{-6} < z < 10^{-2}$;

m is in the range 10hu $-5 < m < 10^{-1}$, and

A is $Eu^{2+}$.

In preferred phosphors according to said empirical formula (I) "a" is in the range of $0.90 < a < 0.96$.

In preferred phosphors according to said empirical formula (I) p is in the range of $10^{-4} < p < 10^{-1}$, and the preferred alkali metal for shifting the maximum of the stimulation spectrum of the phosphor to the shorter wavelengths in combination with samarium is Na or Rb.

In preferred phosphors according to said empirical formula (I) containing strontium in combination with barium the value "x" is preferably in the range $0.12 < x < 0.17$ when $0.90 < a < 0.96$, and $0.55 < x < 0.17$ when $0.85 < a < 0.96$.

In preferred phosphors according to said empirical formula (I) $M^{III}$ is Gd, and "q" is in the range $10^{-5} < q < 10^{-3}$.

In preferred phosphors according to said empirical formula (I) "m" is in $10^{-4} < m < 10^{-2}$ and "z" is in the range $10^{-6} < z < 10^{-1}$.

A photostimulable phosphor according to the present invention is prepared preferably by using as starting materials in the firing:

(1) barium fluoride;

(2) ammonium bromide;

(3) optionally barium halide (except barium fluoride), (4) an alkali metal compound, e.g. lithium fluoride, lithium chloride, lithium bromide, lithium iodide, sodium fluoride, sodium chloride, sodium bromide, potassium fluoride, rubidium fluoride, cesium fluoride, lithium hydroxide or oxide or lithium carbonate, preference being given to sodium bromide or rubidium fluoride;

(5) a strontium halide, optionally in admixture with a calcium and/or magnesium halide;

(6) optionally a $M^{III}$ compound, e.g. halide or oxide wherein $M^{III}$ has the definition given above, preferably $M^{III}$ is Gd;

(7) at least one A containing compound selected from the group consisting of europium halide, europium oxide, europium nitrate and europium sulphate, preferably $EuF_3$ that is reduced to yield $Eu^{2+}$ ions during firing.

(8) a samarium compound, e.g. halide or oxide.

The firing proceeds preferably in the temperature range of 700° to 1000° C. and in a reducing atmosphere.

According to a particular example the preparation of a phosphor according to the present invention proceeds as follows:

—a raw mix of 0.86 mol of $BaF_2$, 0.985 mol of $NH_4Br$ and 0.001 mol of $EuF_3$ was prepared. To that mix small amounts (in the range of 0.1 to 1 wt to the total solids) of $Sm_2O_3$ were added. The thus obtained raw mix was then fired at a temperature between 700° and 1000° C. in a reducing atmosphere. The firing lasted at least 3 h but may proceed up to 10 h.

The reducing atmosphere is a mixture of hydrogen with inert gas, e.g. argon or nitrogen or is formed in situ by reaction of charcoal and water vapour to form a mixture of hydrogen and carbon monoxide or hydrogen and carbon dioxide. In the reducing atmosphere most or all of the present trivalent europium is reduced to divalent europium.

After the firing is completed the product obtained is pulverized. The pulverized product may be further fired. Multiple firing may be advantageous to improve the homogeneity and stimulation properties of the phosphor.

In accordance with the present invention a radiation image recording and reproducing method is provided which method comprises the steps of:

(i) causing a visible radiation stimulable phosphor to absorb penetrating radiation having passed through an object or emitted by an object and to store energy of said penetrating radiation in said phosphor, which is within the scope of the above defined empirical formula (I), (ii) stimulating said phosphor with visible radiation in the wavelength range from 440 nm to 550 nm, preferably in the wavelength range of 480 to 540 nm, to release energy stored in said phosphor as fluorescent light differing in wavelength range from the stimulating light, and (iii) detecting said fluorescent light preferably after substantial separation by filter means from the stimulating light.

Preferred light sources for producing stimulation light in the wavelength range of 440 nm to 550 nm are the frequency doubled (532 nm) solid state Nd-YAG laser, an argon ion laser wherefrom either the 488 nm line or 514 nm emission line is used, and a He-Cd laser emitting at 442 nm.

Suitable filter means for use in said method can be: cut-off filters, transmission bandpass filters and band-reject filters. A survey of filter types and spectral transmittance classification is given in SPSE Handbook of Photographic Science and Engineering, Edited by Woodlief Thomas, Jr. —A Wiley-Interscience Publication —John Wiley & Sons, New York (1973), p. 264–326.

Shortwave pass filters that transmit the shorter wavelengths and reject the longer wavelengths are listed in Table 4.12 of said SPSE Handbook.

Bandpass filters that transmit or reject only a limited band of wavelengths are listed in Tables 4.13 and 4.14 respectively. Tables of many selected long-wave, short-wave pass, and bandpass filters, both liquid and solid, for wavelengths from 150 to 3500 nm, are given by W. Summer, Photo Sensors, Chapman & Hall, London, 1957, chap. 9.

For example, a narrow bandpass filter SCHOTT $BG_3$ (trade name) is used in the method according to the present invention.

For blocking the light of a narrow laser line holographic band-reject filters designed for Raman spectroscopy are used preferably. Such filters are described in the periodical Applied Spectroscopy, Volume 45, Number 5, 1991, p.765–770. Such filters are commercially available from Physical Optics Corporation, 20600 Gramercy Place, Suite 103, Torrance, California 90501 under the name Raman Holographic Edge (RHE) filters. Such filters for blocking selectively 488 nm, 514, and 532 nm laser light are commercially available in diameters of 1 or 2 inch identified by Part Numbers RHE 488, RHE 514 and RHE 532 respectively.

In the catalogue (july 1990) of the company OMEGA OPTICAL INC. 3 Grove Street, PO Box 573, Brattleboro Vt. 05301 USA interference filters and coatings are described. From said catalogue can be learned that there are several types of said band-reject filters on the market. In one type described in said catalogue under the name RAMAN NOTCH (RN) SERIES filters high-performance rejection band filters consist of four precisely aligned interference filters arranged in a chevron baffle (see page 14 of the main catalogue) and are sealed in a rectangular housing. In FIG. 3 of the catalogue optical density versus wavelength (nm) curve for the OMEGA RAMAN NOTCH filter tuned to the 514.5 argon-ion laser is given. It deeply attenuates the laser light to a minimum of $10^{-6}$ has a ripple-free transmission region on both sides of the rejection band, and peak transmission of 90%.

The other type of rejection band filters described in said catalogue under the name OMEGA REJECTION BAND (RB) series filters attenuate a spectral line or a narrow spectral band and transmit wavelengths of light both longer and shorter than those in the band of rejection. RB series filters are useful where weak fluorescent electromagnetic signals are obscured by the relatively very high intensity of the stimulating laser light.

In the method according to the present invention the photostimulable phosphor is used preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Patent Specification 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2. The thickness of the phosphor layer is preferably in the range of 0.05 to 0.5 mm.

According to a preferred embodiment the phosphor layer is used as a support layer on a support sheet. Suitable support materials are made of a film forming organic resin, e.g. polyethylene terephthalate, but paper and cardboard supports optionally coated with a resin layer such as an alpha-olefinic resin layer are also particularly useful. Further glass and metal supports are used in certain circumstances, the latter preferably of high atomic weight, as described e.g. in U.S. Pat. No. 3,872,309 and 3,389,255, for use in industrial radiography (non-destructive testing).

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

For the preparation of the photostimulable phosphor screen the phosphor particles are intimately dispersed in a solution of the binder using an organic solvent, e.g. 2-methoxy-propanol or ethyl acetate, and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

Solvent-less coating may be carried out by using UV or electron beam (EB) curable binder compositions as described e.g. in Research Disclosure December 1977, item 16435.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g, in U.S. Pat. No. 4,380,702.

Optionally a light-absorbing layer is provided between the phosphor-containing layer and its support or in the support itself to avoid reflection and scattering of light at the interface of the support and the phosphor-containing layer, thereby increasing the image resolution of the photostimulable phosphor screen.

Since in the above described X-ray recording system operating with photostimulable radiographic screens the screens are used repeatedly, it is important to provide them with an adequate topcoat for protecting the phosphor-containing layer from mechanical and chemical damage. This is particularly important for photostimulable radiographic screens where each screen normally is not encased in a cassette.

A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor layer as described in published EP 00 392 474.

According to a further known technique a protective overcoat is produced with a radiation-curable composition. Use of a radiation curable coating as protective toplayer in a X-ray conversion screen is described e.g. in EP 209 358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

According to a preferred embodiment the photostimulation of the phosphor-binder layer that has been image-wise or pattern-wise exposed with X-rays proceeds with a scanning laser beam. For use in combination with the phosphor screens according to the present invention preferably 488 nm light of an argon ion laser is used as photostimulating light.

The light emitted by photostimulation (called stimulated light) is detected preferably photo-electronically with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On the phosphors of the present invention measurements have been carried out to determine their photophysical properties.

In one measurement the total photostimulable energy stored upon exposure to a given X-ray dose is determined. Prior to X-ray excitation any residual energy still present in the phosphor screen is removed by irradiation. To avoid photoexcitation during erasure a cut-off Schott GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the MONODOR X-ray source of Siemens AG —W.Germany may be used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The photostimulating light used in these measurements was 488 nm light of an argon ion laser, frequency-doubled laser light (532 nm) of a Nd-YAG laser or 633 nm He-Ne laser light.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multi programmer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 7 mm2 is exposed. Only half of the laser power reaches the screen surface. In this way the intensity of the stimulating beam is more uniform. A red filter (3 mm SCHOTT OG 590) placed immediately in front of the laser eliminates the weak ultraviolet components in the He-Ne laser emission and in the frequency doubled NdoYAG laser emission. In case the argon ion laser light of 488 nm is used for photostimulation a combination of a SCHOTT GG455 and BG39 filter was placed in front of the laser to remove both the weak ultraviolet and infrared components of the laser emission light. The signal amplitude from the photomultiplier is linear with the intensity of the photostimulating light and with the released photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $f(t) = A \cdot e^{-t/\tau}$: wherein A is the amplitude, $\tau$ is the time constant, t is the stimulation time, and e is the base number of natural logarithms.

63 % of the stored energy has been released at $t = \tau$. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated.

Because the emission light is scattered in all directions only a fraction of the emitted light is detected by the photomultiplier. The positions of the panel and photomultiplier are such that 10% of the total emission is detected by the photomultiplier.

After all these corrections have been made a value for conversion efficiency (C.E$_1$.) is obtained expressed in pJ/mm$^2$/mR. To correct for the the total quantity of phosphor irradiated with X-rays, this value is divided by the screen thickness to yield a conversion efficiency (C.E.) expressed in pJ/mm$^3$/mR. This value varies with screen thickness and therefore for measurements to be comparable they have to be carried out at constant phosphor coverage.

The stimulation energy (S.E.) is defined as the laser-energy necessary to release 63% of the stored energy and is expressed in $\mu$J/mm$^2$.

The sensitivity of the X-ray image recording and the conversion of the stored energy by photostimulation in photo-electronically detectable signals may be expressed by the ratio of C.E. to S.E. Said ratio expressed in units of 10−9/mm.mR is called here the figure of merit (F.O.M.) and is expressed by the following equation:

$$F.O.M. = 1000 \times (C.E.)/S.E.$$

In another measurement the stimulation spectrum is determined. The light of a tungsten (quartz-iodine) lamp is fed into a monochromator (Bausch and Lomb—Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp, The measurement can be repeated so that the evolution of the stimulation spectrum can be followed over a period of up to 15 hours.

In still another measurement the thermally stimulated luminescence (TSL) of the phosphors is measured. For that purpose a phosphor sample is first irradiated with X-rays and subsequently transferred in the dark to the oven of the TSL equipment, The phosphor samples are compressed disks each containing 0.5 g of phosphor. The bottom of the oven is an aluminium plate, mounted in a hollow aluminium cylinder which is heated electrically.

The temperature is recorded by a thermocouple at the bottom aluminium plate. On top of said plate a second aluminium cylinder is arranged and in this cylinder three quartz disks are mounted with an interspace of 5 mm to ensure thermal insulation.

The oven is built-in in a thermally insulating block of $SiO_2$ (Glass Rock Foam) and has a circular opening at the top to let through the emission light of the phosphor.

During the measurement the sample is heated at a constant rate and the intensity of the luminescence by the phosphor is measured as a function of temperature. The light-intensity is measured with a photomultiplier tube, placed on top of the circular opening of the insulating block. Between that opening and the photomultiplier entrance a combination of a BG3 and HOYA B390 filter is placed to stop the light of wavelengths longer than 480 nm. In this way the black-body radiation signal is strongly diminished. To calibrate the TSL equipment, samples of LiF-TLD-100 were irradiated with X-rays and subsequently heated at a rate of 10 K/min. The position of the peaks is compared with the literature data of this material. All measurements are done at a heating rate of 10 K/min.

The temperature at which light is released is related to the stability of the electron-trapping centres (F-centres) of the phosphor. We assume that by the presence of $M^I$ cations, optionally in combination with $M^{III}$ cations, electrons are captured in more stable F-centres than in barium fluorbromide phosphors free from said cations. The electrons from said F-centres are released from the F-centres at higher temperature. The peak-temperatures in the TSL spectra are a measure for the stability of the electron trapping and are related to dark decay; the higher the peak temperature the longer is the dark decay time.

The following examples illustrate the present invention without however limiting it thereto.

COMPARATIVE EXAMPLE 1 AND INVENTION EXAMPLES 2 AND 3

A raw mix was prepared with the empirical composition:

$$Ba_{0.858}Sr_{0.141}Eu_{0.001}F_{1.0147}Br_{0.9853}$$

starting from $BaF_2$, $SrF_2$, $NH_4Br$ and $EuF_3$. One kg of this raw mix was prepared and blended in a V-blender. From this raw mix three samples of each 30 g were taken.

To prepare the comparative example I phosphor material 30 g of the above defined raw mix was fired as such. The stimulation spectrum of the comparison phosphor is given in FIG. 1.

To prepare phosphors according to the present invention small amounts of a Sm compound were added to the raw mix before firing.

All samples were fired in the following way:

A first firing was performed in a box furnace at 850° C. during 160 mi nutes. The cruci bl es contai ni ng each their sample were pl aced each i n a larger crucible containing carbon and water to produce a reducing atmosphere. After grinding, the samples were fired for a second time in a tube furnace at 830° C. for 3 hours in a 99.8 vol % $N_2$—0.2 vol % $H_2$ atmosphere. After cooling the phosphor samples were reground.

In the preparation of the phosphor of the Invention Example 2 1 wt % of $Sm_2O_3$ was mixed thoroughly with the raw mix prior to the first firing. The stimulation spectrum of said phosphor is given in FIG. 2.

In the preparation of the phosphor of the Invention Example 3 0.3 wt % of $Sin_2O_3$ was mixed thoroughly with the raw mix prior to the first firing.

After firing and cooling the phosphor powders were ground and then dispersed in a binder solution containing cellulose acetobutyrate dissolved in methyl ethyl ketone. The dispersions obtained were coated separately onto a 100 μm thick transparent sheet of polyethylene terephthalate to give a dry coating weight of about 1000 g/m2. The dried screens were then used to determine the stimulation spectra of the phosphors.

From the stimulation spectrum of the phosphor prepared according to the Invention Example 2 can be learned that the maximum of said spectrum is shifted clearly to the shorter wavelengths such in comparison with the photostimulation spectrum (see FIG. 1) of the comparison phosphor of Example 1.

The TSL spectra of the phosphors according to Example 1 and Invention Example 2 were determined as described above.

Figure 1:
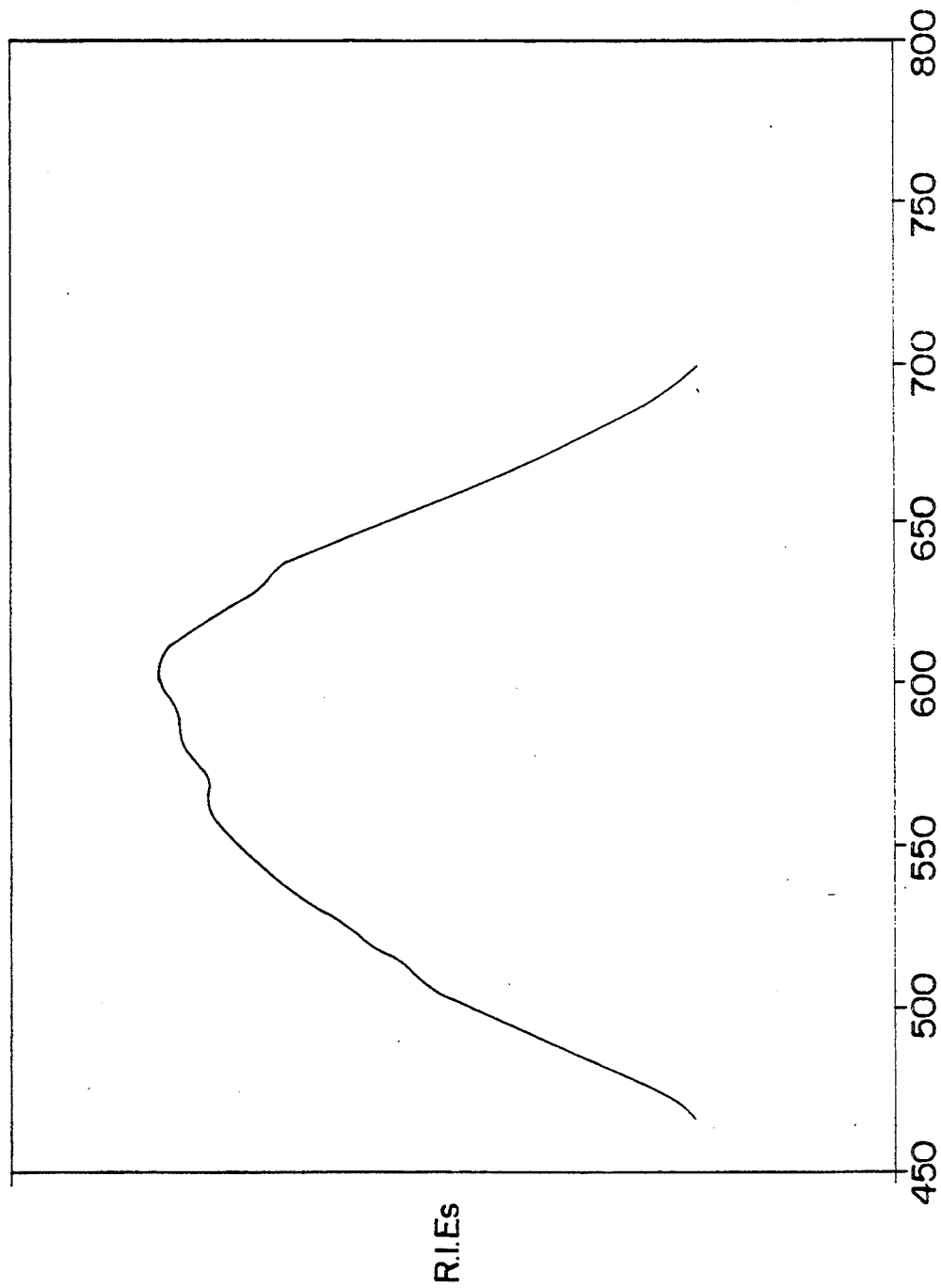
Figure 2:
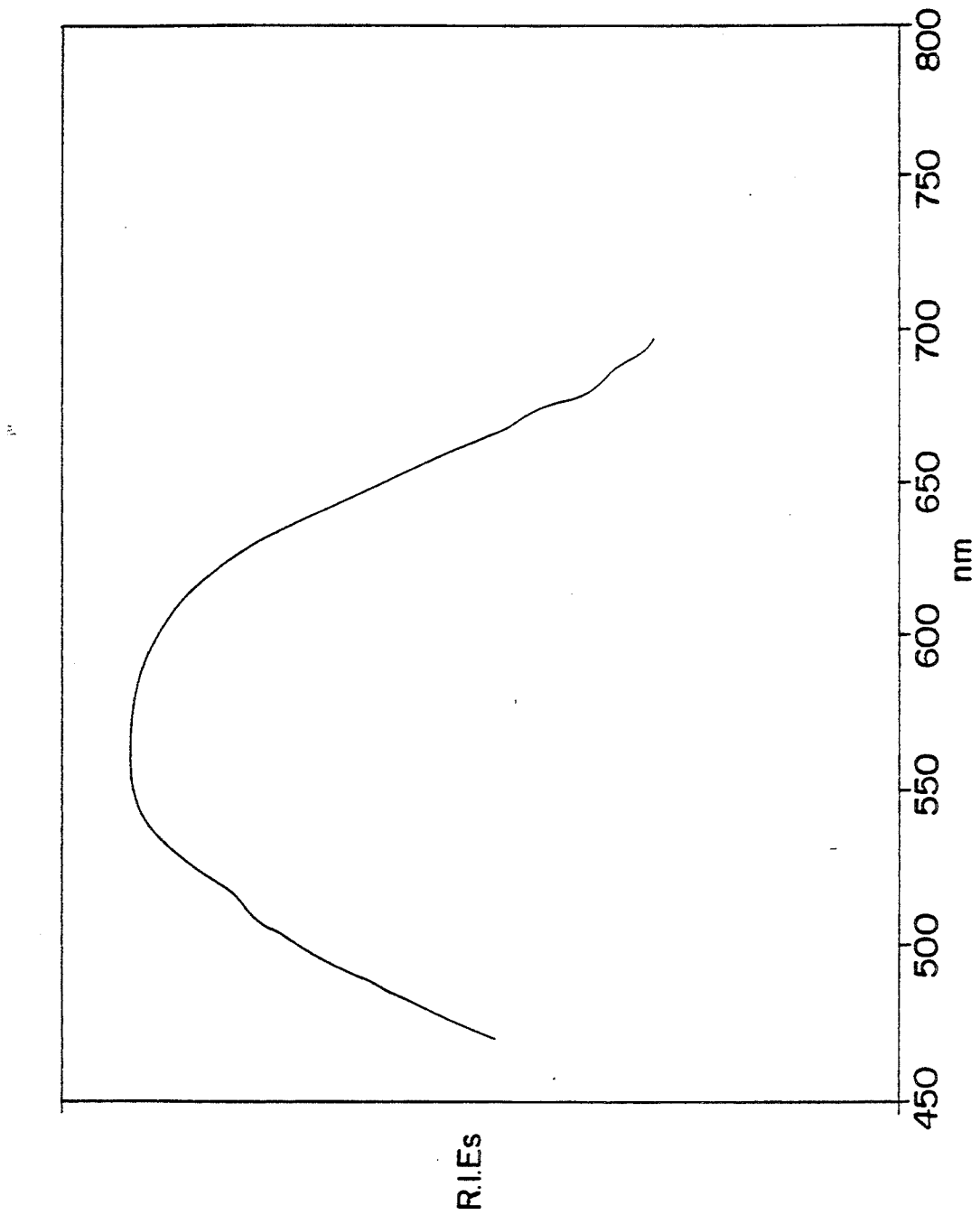
Figure 3:
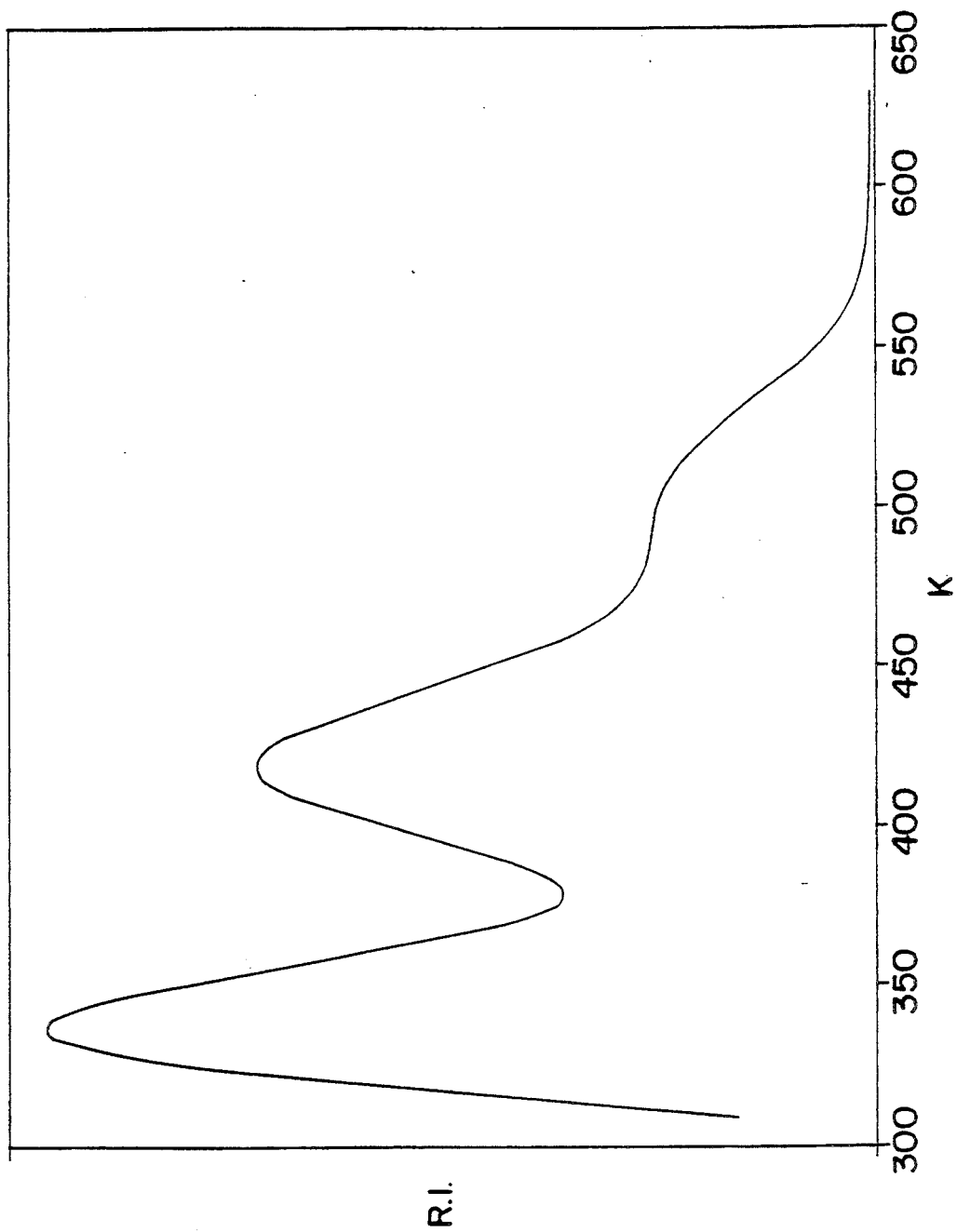
FIG. 3 represents the TSL spectrum of the comparison phosphor prepared according to Example 1.
Figure 4:
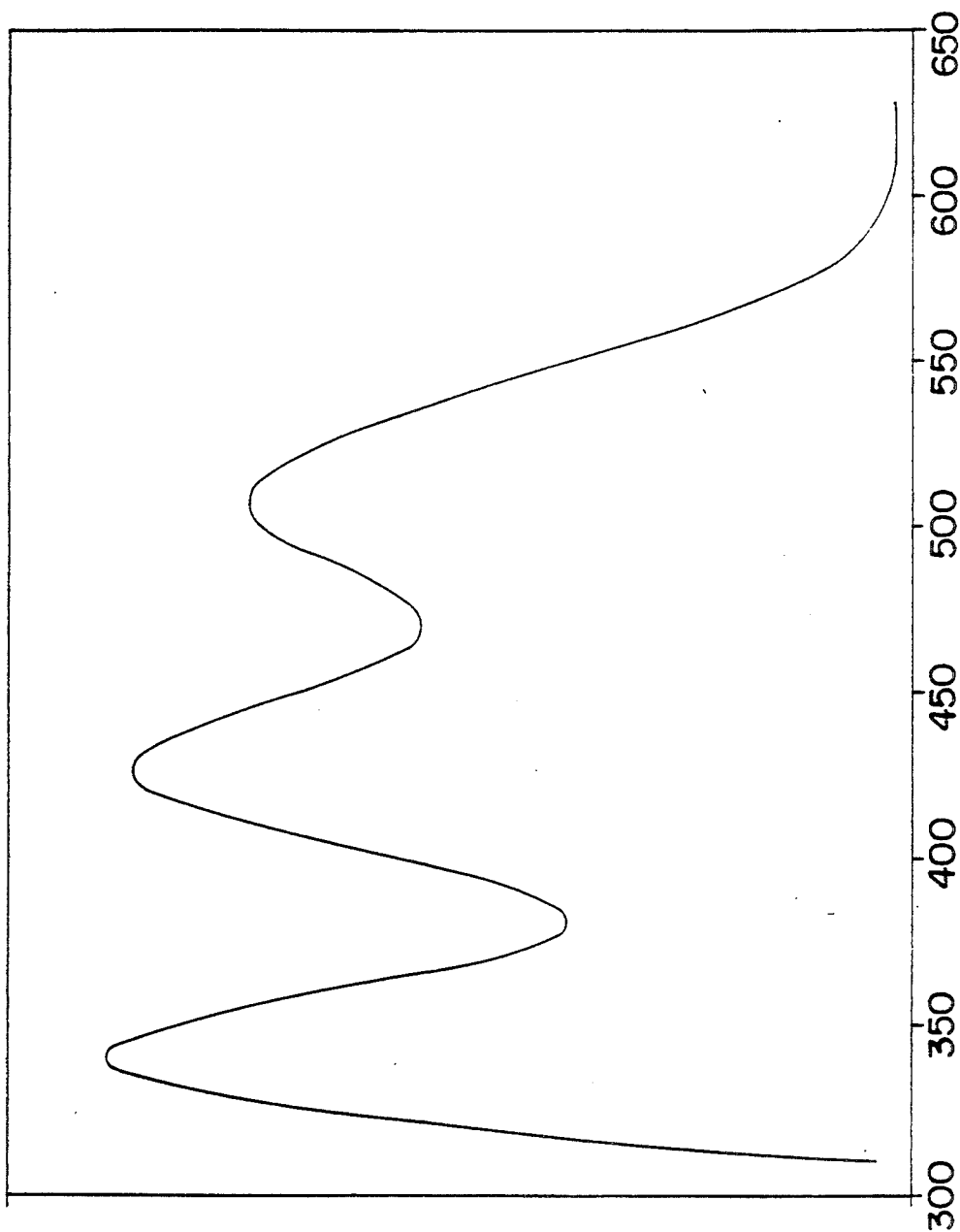
FIG. 4 represents the TSL spectrum of the phosphor prepared according to Inventi on Example 2.

The presence of 3 bands (peaks) in the TSL spectra of said phosphors indicates the presence of three different electron traps. The intensity bands corresponding with the higher temperatures are much more pronounced in the samarium codoped phosphor than in the samarium-free phosphor.

The figure of merit (F.O.M.) as defined herein of the phosphors prepared according to the comparison example 1 and of the invention examples 2 and 3 was determined using frequency doubled Nd-YAG laser light of 532 nm for stimulation and used to calculate the relative figure of merit (R.F.O.M.) of the invention phosphors by setting the figure of merit of the comparison phosphor equal to 1. As a result of said operation it was found that the R.F.O.M. of the phosphors of invention examples 2 and 3 is 1.18 and 1.26 respectively.

The conversion efficiency (C.E.) of the example 2 material has been measured using respectively argon ion laser light of 488 nm and He-Ne laser light of 633 nm in the photostimulation.

The ratio C.E.$_{(488\ nm)}$/C.E.$_{(633\ nm)}$ is 1.95 which proves that for the example 2 phosphor photostimulation with argon ion laser light of 488 nm is much more efficient than photostimulation with He-Ne laser light of 633 nm.

We claim:

1. A photo stimulable phosphor of which the emission intensity at the stimulation wavelength of 550 nm is higher than the emission intensity at the stimulation wavelength of 600 nm, characterized in that said phosphor is a divalent europium activated barium fluorobromide containing as codopant samarium, and wherein the terminology barium fluorobromide stands for an empirical formula wherein (1) a minor part of the barium (less than 50 atom %) is replaced by at least one metal selected from the group consisting of a monovalent alkali metal, a divalent alkaline earth metal other than barium, and optionally a trivalent metal selected from the group consisting of Al, Ga, In, Tl, Sb and Bi, (2) a minor part (less than 50 atom %) of the bromine is replaced by chlorine and/or iodine, (3) fluorine is present stoichiometrically in a larger atom % than bromine alone or bromine combined with chlorine and/or iodine, and (4) the alkali metal is selected from the group consisting of Li, Na, K, Rb and Cs, and is present with respect to barium in an atom percent in the range of $10^{-4}$ to $10^{-2}$ at %.

2. Photostimulable phosphor according to claim 1, wherein samarium is present with respect to barium in an atom percent in the range of $10^{-5}$ to $10^{-1}$ at %.

3. Photostimulable phosphor according to claim 1, wherein an alkaline earth metal is present selected from the group consisting of Sr, Mg and Ca with respect to barium in an atom percent in the range of $10^{-3}$ to $2\times10^{-1}$ at %.

4. Photostimulable phosphor according to claim 1, wherein said trivalent metal is present with respect to barium in an atom percent in the range of $10^{-3}$ to $10^{-1}$ at %.

5. Photostimulable phosphor according to claim 1, wherein strontium is present in combination with barium.

6. Photostimulable phosphor according to claim 1, wherein fluorine is 3 to 12 atom % in excess over bromine or bromine combined with chlorine and/or iodine.

7. Photostimulable phosphor according to claim 1, wherein said phosphor is within the scope of the following empirical formula (I)

$$Ba_{1-x-y-p-3q-z-3m}Sr_xM_y^{II}M2_p^{I}M2_q^{III}F_{2-a-b}Br_aX_b:zA:2mSm$$

wherein:

X is at least one halogen selected from the group consisting of Cl and I, $M^I$ is at least one alkali metal selected from the group consisting of Li, Na, K, Rb and Cs;

$M^{II}$ is at least one alkaline earth metal selected from the group consisting of Ca and Mg;

$M^{III}$ is at least one metal selected from the group consisting of Al, Ga, In, Tl, Sb and Bi;

a is a number satisfying the conditions of $0.85 < a - 0.96$ when x is $0.17 < x < 0.55$ and $0.90 < a < 0.96$ when x is $0.12 < x < 0.17$;

y is in the range $0 < y < 10^{-1}$;

b is in the range $0 < b < 0.04$;

p is in the range $10^{-4} < p < 10-1$;

q is in the range $0 < q < 0.1$;

z is in the range $10^{-6} < z < 10^{-2}$;

m is in the range $10^{-5} < m < 10^{-1}$ and

A is $Eu^{2+}$.

8. Photostimulable phosphor according to claim 7, wherein in said empirical formula $M^I$ is Na or Rb.

9. Photostimulable phosphor according to claim 7, wherein in said empirical formula z is in the range $10^{-6} < z < 10^{-1}$.

10. Photostimulable phosphor according to claim 7, wherein said phosphor is prepared by firing a mixture of the following starting materials:
(1) barium fluoride;
(2) ammonium bromide;
(3) optionally barium halide (except barium fluoride);
(4) at least one alkali metal compound selected from the group consisting of lithium fluoride, lithium chloride, lithium bromide, lithium iodide, sodium fluoride, sodium chloride, sodium bromide, potassium fluoride, rubidium fluoride and cesium fluoride, lithium hydroxide or oxide or lithium carbonate;
(5) a strontium halide, optionally in admixture with a calcium and/or magnesium halide;
(6) optionally a said $M^{III}$ compound;
(7) at least one A containing compound selected from the group consisting of europium halide, europium oxide, europium nitrate and curopium sulphate, and
(8) a samarium compound.

* * * * *